E. B. WEDMORE.
PROTECTIVE DEVICE.
APPLICATION FILED OCT. 24, 1919.
1,343,018.
Patented June 8, 1920.
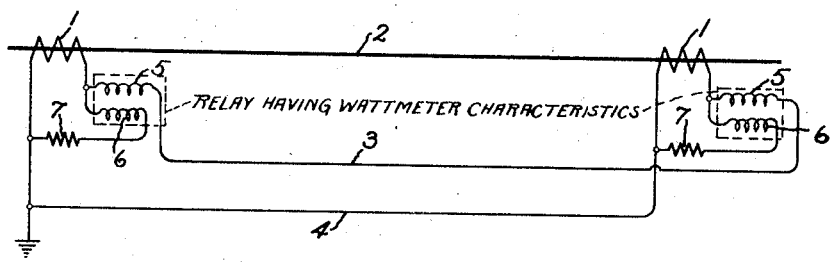
Inventor:
Edmund B. Wedmore,
by Albert G. Davis
His Attorney.

UNITED STATES PATENT OFFICE.

EDMUND BASIL WEDMORE, OF HENDON, ENGLAND, ASSIGNOR TO GENERAL ELECTRIC COMPANY, A CORPORATION OF NEW YORK.

PROTECTIVE DEVICE.

1,343,018. Specification of Letters Patent. Patented June 8, 1920.

Application filed October 24, 1919. Serial No. 333,011.

*To all whom it may concern:*

Be it known that I, EDMUND BASIL WEDMORE, a subject of the King of Great Britain, residing at Hendon, England, have invented certain new and useful Improvements in Protective Devices, of which the following is a specification.

My invention relates to improvements in protective devices for electric feeders and electric current distribution systems and has for its object to provide a protective system in general of the pilot wire type in which the effect of capacity current is compensated for and erroneous operation of the system prevented.

In protective systems of the pilot wire type it is customary to connect a current transformer at each end of a feeder to be protected, the secondaries of which are connected by pilot wires and associated with relays or control devices operative to cut out the feeder on the occurrence of a fault producing a disturbance of the normal ratio of input to output of the feeder. With such a system, a capacity current normally flows in the pilot wire circuit which, especially in large power systems causes the relays to operate on overload when no fault exists.

By the use of the system of my invention the effect due to capacity of the pilot wires is overcome by the employment of relays having the general characteristics of wattmeters but so adjusted as to be inoperative on a current flowing in the pilot wire circuit due to capacity alone. The capacity current so flowing is utilized to give a restraining force in the relays to prevent them from operating unless under the conditions in which they are intended to operate.

In carrying my invention into effect, the relay used is not constructed as a true wattmeter but as a poor wattmeter, such that the forces on the moving element are zero, not on a current leading 90 degrees but on a current leading materially less than 90 degrees, that is a current having a material energy component. I may employ, for example, the construction used for a dynamometer wattmeter, furnishing a moving coil connected in series with the pilot wire circuit and a fixed coil which may be connected in shunt to the local protective transformer or other suitable source. The characteristics of the circuit of the fixed coil can be adjusted so as to carry current lagging by a suitable amount to compensate for the energy component of the current flowing in the pilot wire circuit due to capacity alone. I may also over-compensate so as to provide a restraining force which will vary with the current in the primary winding of the transformer energizing the fixed coil.

On a fault occurring on the system causing additional energy current to flow in the pilot wire, this additional energy current will modify the phase relationship of the currents in the two relay windings so that the restraining force is neutralized and an operating force is obtained.

I do not confine myself to the employment of a relay constructed as above but may employ any construction giving the general characteristic of a wattmeter with the particular adjustment required to obtain the above characteristic. For example, I may employ the construction of an induction wattmeter and arrange that the current in what is normally the potential winding shall lag by more than the usual 90 degrees.

The accompanying drawing diagrammatically illustrates my invention as applied to a single phase feeder protected by apparatus as above referred to.

In the drawing protective transformers 1 are connected as usual in circuit, one at either end of the feeder 2 having secondaries, one end of each being connected through a pilot wire 3, so that the transformers are normally in opposition, and the other end of each connected through a return wire 4, which may be earthed as shown.

According to my invention, I may employ a relay constructed on the lines of a dynamometer having two windings 5 and 6 connected as indicated in the diagrams. One of these windings 6 constituting a field coil is connected in shunt to the protective transformers and furnished with an external resistance 7. The other winding 5 constituting a moving coil is connected in series with the pilot wire 3.

So long as the feeder is sound, the protective transformers act as potential transformers and apply potential to the windings. The current in the field winding will be proportional to the applied potential, this winding being in direct shunt to the transformer. The current in the other winding will be that due to the capacity between the pilot wire and earth, and will again be proportional to the applied potential.

The current in the pilot wire circuit will be a leading current, leading by some amount less than 90 degrees, due to the resistance of the pilot wire circuit.

The circuit, consisting of the field winding, together with its external resistance, must have its power factor adjusted so that the angle of lag is at least as great as the angle obtained by subtracting the angle of lead in the pilot wire circuit from 90 degrees.

With this arrangement, and assuming a small margin of difference between the angles is provided for safety, the moving coil will show a tendency to move in one direction under normal conditions, but in the event of a fault in the main feeder resulting in diminution or reversal of the current in one of the two protective transformers, a corresponding additional current will flow in the pilot wire circuit, this being an energy current. This additional current will reduce the lead of the current in the pilot wire circuit and result in reversal of the direction of motion of the moving coil. The moving coil is arranged to move so as to actuate a circuit closing device on the occurrence of a fault.

In carrying out my invention in accordance with this disclosure, it is necessary to give a little attention to the changes which may occur on change of frequency.

If there is an increase in frequency which may, for example, accompany a short circuit due to the presence of higher harmonics, the reactance in both the pilot wire and field coil circuits will be more effective, and it is necessary to insure that there is sufficient reactance in the field winding circuit, so that the action of the relay is not reversed on forward current.

What I claim as new and desire to secure by Letters Patent of the United States, is,—

1. In a protective system for an electric feeder, the combination with a transformer at each end of said feeder, pilot wires connecting the secondaries of said transformers in an external circuit, and a relay at each end of said feeder comprising two windings, one winding excited by the current in the pilot wire, and the other winding excited by a current proportional to the load current in said feeder, and means for changing the phase relations of said currents to compensate for the capacity current normally flowing in said pilot wire circuit.

2. In a protective system for an electric feeder, the combination with a transformer at each end of said feeder, pilot wires connecting the secondaries of said transformers in an external circuit, and a relay having wattmeter characteristics at each end of said feeder comprising coöperating movable and fixed coils, one in shunt to each secondary and the other in series therewith, and means for changing the characteristics of the circuit of the fixed coil to compensate for the energy component of the current flowing in the pilot wire circuit due to capacity alone.

3. In a protective system for an electric feeder, the combination with a transformer at each end of said feeder, pilot wires connecting the secondaries of said transformers in an external circuit, and a relay having wattmeter characteristics at each end of said feeder comprising a fixed coil connected in shunt to each transformer secondary, and a movable coil connected in series with each transformer secondary, the circuit of said fixed coil having its power factor so adjusted that the angle of lag is at least as great as the angle of lead in the movable coil circuit.

4. In a protective system for an electric feeder, the combination with a transformer at each end of said feeder, pilot wires connecting the secondaries of said transformers in an external circuit, and a relay having wattmeter characteristics at each end of said feeder comprising a field coil in shunt to each transformer secondary, a movable coil in series with each secondary, and means whereby capacity current in said pilot wire circuit is in such a phase relation in one of said coils relative to the phase relation of the energy component of the current in the other of said coils that the effect of capacity current is to prevent the operation of the relay.

5. In a protective system for an electric feeder, the combination with a transformer at each end of said feeder, pilot wires connecting the secondaries of said transformers in an external circuit, and a relay having wattmeter characteristics at each end of said feeder comprising a field coil in shunt to each transformer secondary, a movable coil in series with each secondary, and means whereby the currents in the field and movable coils are in such a phase relation that normally the effect of the capacity current acts to hold the relay inoperative.

6. In a protective system for an electric feeder, the combination with a transformer at each end of said feeder, pilot wires connecting the secondaries of said transformers in an external circuit, a relay having wattmeter characteristics at each end of said feeder comprising a field coil in shunt to each transformer secondary, a movable coil in series with each transformer secondary, and means whereby the effect of capacity current in the pilot wire circuit is compensated for by adjusting the phase relations of the currents in the field and movable coils such that the effect of capacity current alone holds the relay inoperative.

In witness whereof I have hereunto set my hand this 29th day of Sept., 1919.

EDMUND BASIL WEDMORE.